J. R. SNYDER.
EMERGENCY CUT-OFF VALVE.
APPLICATION FILED MAR. 30, 1912. RENEWED JULY 30, 1913.
1,089,088.
Patented Mar. 3, 1914.
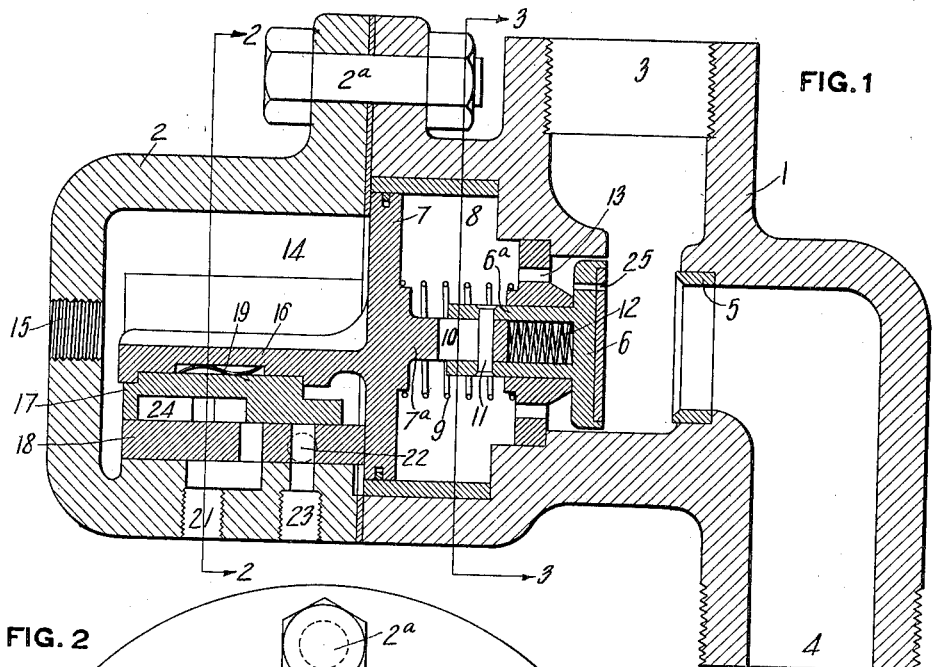
FIG. 1
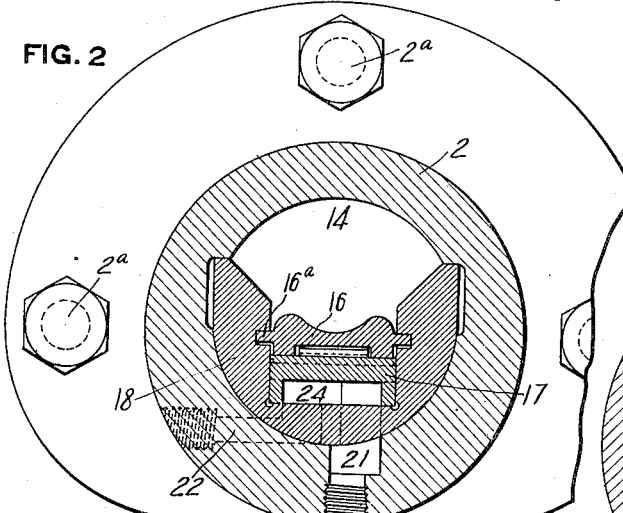
FIG. 2
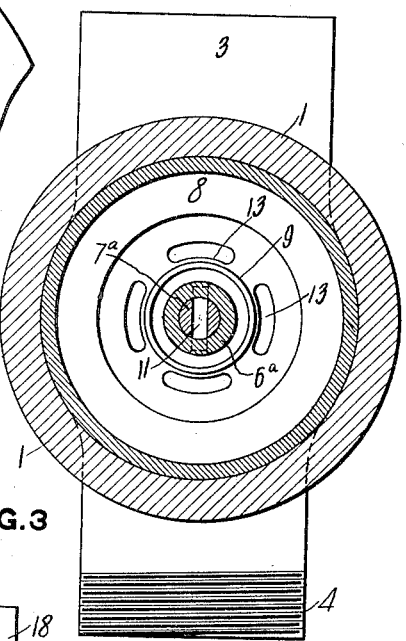
FIG. 3
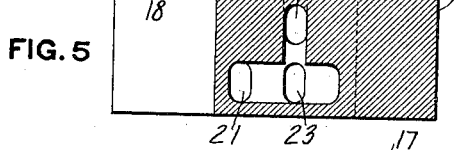
FIG. 5
FIG. 4
WITNESSES
INVENTOR
Jacob Rush Snyder
By Fredk W Winter
Attorney

UNITED STATES PATENT OFFICE.

JACOB RUSH SNYDER, OF PITTSBURGH, PENNSYLVANIA, ASSIGNOR, BY MESNE ASSIGNMENTS, TO PITTSBURGH AIR BRAKE COMPANY, A CORPORATION OF PENNSYLVANIA.

EMERGENCY CUT-OFF VALVE.

1,089,088.  Specification of Letters Patent.  Patented Mar. 3, 1914.

Application filed March 30, 1912, Serial No. 687,536. Renewed July 30, 1913. Serial No. 782,140.

*To all whom it may concern:*

Be it known that I, JACOB RUSH SNYDER, a resident of Pittsburgh, in the county of Allegheny and State of Pennsylvania, have invented a new and useful Improvement in Emergency Cut-Off Valves, of which the following is a specification.

This invention relates to an automatic safety valve for air brake systems arranged to cut off the steam to the engine and to apply the engine brakes whenever the train line bursts from any cause.

The object of the invention is to provide a simple valve for the purpose stated which acts entirely automatically to both shut off the steam and apply the brakes on the engine and conserve the main reservoir pressure whenever a hose or other part of the train line bursts or when the conductor's valve is opened, so as to prevent the engine from tearing from the train, but which is so constructed that it does not act in the regular emergency applications of the brake, or at least produces no evil effect.

The invention comprises a valve constructed and arranged as hereinafter described and claimed.

In the accompanying drawing Figure 1 is a longitudinal section through the valve; Fig. 2 is a transverse section on the line 2—2, Fig. 1; Fig. 3 is a similar view on the line 3—3, Fig. 1; and Figs. 4 and 5 are diagrammatic horizontal sectional views illustrating the slide valve and valve seat and showing the slide valve in its two positions.

The valve comprises a suitable casing shown as formed in two parts marked respectively 1 and 2, and suitably joined, such as by means of bolts 2ª. This casing is provided with a connection 3 leading to the usual engineer's brake valve and another connection 4 leading to the train pipe. Between these two connections is a seat 5 for the cut-off valve 6, said valve seating toward the train pipe and when on its seat closing communication between the engineer's brake valve and the train pipe. Valve 6 is adapted to be actuated by piston 7 working in chamber 8 and normally held by spring 9 in position to maintain valve 6 open. The valve 6 has a lost motion connection with the piston, such as by providing the piston stem with a slot 10 through which passes pin 11 carried by the piston stem. A light spring 12 normally presses the valve away from the piston. This spring, however, is so light that when the valve is closed, it yields to allow the valve to open by a moderate preponderance of pressure on the train pipe side. The piston 7, on one face is subjected to train pipe pressure in chamber 8 coming by way of ports 13. On its opposite side said piston is subjected to pressure in chamber 14 coming from the equalizing reservoir which is connected at 15. The piston 7 is also provided with a stem 16 projecting into chamber 14 and guided by wings 16ª entering grooves in the bushing 18. Said stem actuates a slide valve 17 on a seat formed by the lower portion of bushing 18. A spring 19 normally holds the valve against its seat. The seat 18 is provided with three ports, to-wit, port 21 leading to the engine and tender brake cylinders; port 22 leading to a steam cut-off valve, that is, a valve so arranged that upon the admission of pressure thereto it cuts off the supply of steam from the boiler to the engine cylinders; and a port 23 connected to the main reservoir by way of the engineer's brake valve. The slide valve 17 is provided with a single cavity 24 of the form shown in Figs. 4 and 5.

So long as the continuity of the train line remains unbroken, the normal position of the valve is that shown in Figs. 1 and 4, with ports 21, 22 and 23 blanked; the piston 7 being normally held in the position shown, by spring 9 plus the preponderance of train pipe pressure over the pressure in the equalizing reservoir, with valve 6 open so that communication is freely established between the engineer's brake valve and the train pipe. Whenever the train line pressure is suddenly reduced by the bursting of the train pipe or of a hose, or by the opening of the conductor's valve, or by any means, accidental or intentional, other than the intentional action of the engineer on the leading engine, so that the continuity of the train line is interrupted, the sudden reduction of pressure is communicated to the chamber 8, so that the piston 7 is forcibly moved to the right by the preponderance of equalizing reservoir pressure in chamber 14. This seats valve 6 and closes communication between the engineer's brake valve and the train pipe, thereby preventing the wasting of main reservoir pressure to the atmosphere, even though the engineer's brake valve remains in running or full release position. This feature does away with the necessity of the engineer moving the brake valve to lap position when the train pipe bursts in order to conserve the main reservoir pressure. At the same time, the slide valve 17 is moved to the position shown in Fig. 5, bringing the ports 21, 22 and 23 into communication and permitting main reservoir pressure coming by way of the engineer's valve through port 23 to flow to both the engine and tender brake cylinders, thereby automatically applying the engine and tender brakes and so holding same regardless of brake cylinder leakage, and also flowing to the steam cut-off valve, thereby cutting off the supply of steam to the engine cylinders and enabling the brakes to more quickly slow down the engine. The consequence is that danger of tearing the engine from the rest of the train whenever a hose bursts is entirely avoided and the waste of main reservoir air is also prevented. In case the brakes are applied for emergency application in the usual way, the necessary reduction of pressure is made at the engineer's brake valve. In such application the equalizing reservoir is also exhausted to the atmosphere so that air escapes from the train pipe not only at the engineer's brake valve but also at the equalizing valve. Consequently, the valve described does not act. Even if equalizing reservoir pressure is not exhausted and the valve goes over to the right, the same as when a hose bursts, it will not interfere with the proper emergency application for the reason that the train pipe pressure then rushing to the engineer's valve will open valve 6 against the relatively light spring 12, and permit the train pipe to be exhausted to the necessary degree.

The valve 6 is provided with an equalizing port 25. This is for the purpose of enabling the piston 7 to be moved to its left hand position after an actuation. In the train line adjacent the connection 4 will be placed a shut off cock. This will be momentarily closed after an actuation of the valve, and main reservoir pressure will leak through port 25 into chamber 4 until the pressures on opposite sides of valve 6 balance, thus permitting spring 9 to move piston 7 to the left.

The valve described acts entirely automatically, so that upon bursting of a hose or like condition, the engineer has no duties to perform in applying the brakes of the engine or cutting off the supply of steam or in conserving the air in the main reservoir. He is, therefore, entirely free to perform such other duties as require immediate attention under such circumstances.

What I claim is:

1. An emergency cut-off valve for air brake systems, having connections to a steam cut-off valve, a brake cylinder, a source of pressure, the main reservoir and the train pipe, a valve, a movable abutment for actuating said valve open to train pipe pressure on one side and to reservoir pressure on its opposite side, ports and passages controlled by said valve and arranged on reduction of pressure on the train pipe side of the movable abutment to connect the source of pressure with the steam cut-off valve and with the brake cylinder, and a second valve actuated by said movable abutment and acting to cut off communication between the main reservoir and the train pipe.

2. An emergency cut-off valve for air brake systems, having connections to a steam cut-off valve, a brake cylinder, a source of pressure, the main reservoir and the train pipe, a valve, a movable abutment for actuating said valve open to train pipe pressure on one side and to reservoir pressure on its opposite side, ports and passages controlled by said valve and arranged on reduction of pressure on the train pipe side of the movable abutment to connect the source of pressure with the steam cut-off valve and with the brake cylinder, and a second valve actuated by said movable abutment and acting to cut off communication between the main reservoir and the train pipe, said valve seating toward the train pipe and having a yielding connection with the movable abutment so as to open under preponderance of train pipe pressure.

3. An emergency cut-off valve for air brake systems, having connections to a steam cut-off valve, a brake cylinder, a source of pressure, the main reservoir and the train pipe, a valve, a movable abutment for actuating said valve open to train pipe pressure on one side and to reservoir pressure on its opposite side, ports and passages controlled by said valve and arranged on reduction of pressure on the train pipe side of the movable abutment to connect the source of pressure with the steam cut-off valve and with the brake cylinder, a second valve actuated by said movable abutment and acting to cut off communication between the main reservoir and the train pipe, and a spring supplementing the action of train pipe pressure on said movable abutment.

4. An emergency cut-off valve for air brake systems, having connections to a steam cut-off valve, a brake cylinder, a source of pressure, an equalizing reservoir, the main reservoir and the train pipe, a movable abutment open to train pipe pressure on one side and to equalizing reservoir pressure on its opposite side, a slide valve actuated by said movable abutment, ports and passages controlled by said slide valve and arranged on sudden reduction or pressure on the train pipe side of the movable abutment to connect the source of pressure to the steam cut-off valve and to the brake cylinder, and a second valve actuated by the movable abutment and acting to cut off communication between the main reservoir and the train pipe.

5. An emergency cut-off valve for air brake systems, having connections to a steam cut-off valve, a brake cylinder, a source of pressure, an equalizing reservoir, the main reservoir and the train pipe, a movable abutment open to train pipe pressure on one side and to equalize reservoir pressure on its opposite side, a slide valve actuated by said movable abutment, ports and passages controlled by said slide valve and arranged on sudden reduction of pressure on the train pipe side of the movable abutment to connect the source of pressure to the steam cut-off valve and to the brake cylinder, and a second valve actuated by the movable abutment and acting to cut off communication between the main reservoir and the train pipe, said last named valve seating toward the train pipe and having a yielding connection to the piston so arranged as to allow said valve to open under preponderance of train pipe pressure.

In testimony whereof, I have hereunto set my hand.

JACOB RUSH SNYDER.

Witnesses:
F. W. WINTER,
WILLIAM B. WHARTON.

Copies of this patent may be obtained for five cents each, by addressing the "Commissioner of Patents, Washington, D. C."